US009046235B2

(12) United States Patent
Wilson

(10) Patent No.: US 9,046,235 B2
(45) Date of Patent: Jun. 2, 2015

(54) LED RENEWABLE ENERGY LIGHTING UNIT HAVING A POLYGONAL SOLAR PANEL CONFIGURATION ABOUT A HORIZONTAL OR VERTICAL POLE

(71) Applicant: Oswald A. Wilson, Freehold, NJ (US)

(72) Inventor: Oswald A. Wilson, Freehold, NJ (US)

(*) Notice: Subject to any disclaimer, the term of this patent is extended or adjusted under 35 U.S.C. 154(b) by 0 days.

(21) Appl. No.: 14/458,216

(22) Filed: Aug. 12, 2014

(65) Prior Publication Data

US 2015/0043200 A1 Feb. 12, 2015

Related U.S. Application Data

(60) Provisional application No. 61/864,720, filed on Aug. 12, 2013.

(51) Int. Cl.
| F21S 8/00 | (2006.01) |
| F21S 9/03 | (2006.01) |
| F21S 8/08 | (2006.01) |
| F21S 9/02 | (2006.01) |
| F21V 29/00 | (2006.01) |
| F21W 131/103 | (2006.01) |
| F21Y 101/02 | (2006.01) |

(52) U.S. Cl.
CPC ............... F21S 9/035 (2013.01); F21S 8/086 (2013.01); F21S 9/026 (2013.01); F21V 29/2206 (2013.01); F21V 29/004 (2013.01); F21W 2131/103 (2013.01); F21Y 2101/02 (2013.01)

(58) Field of Classification Search
CPC ........................ F21Y 2101/02; F21V 33/006

USPC ............ 362/235, 294, 145, 373, 800, 249.02, 362/244
See application file for complete search history.

(56) References Cited

U.S. PATENT DOCUMENTS

| 4,200,904 A | 4/1980 | Doan |
| 6,060,658 A * | 5/2000 | Yoshida et al. ............... 136/243 |
| 7,731,383 B2 | 6/2010 | Myer |
| 7,976,180 B1 | 7/2011 | Haun et al. |
| 8,007,124 B2 | 8/2011 | Kim |
| 8,029,154 B2 | 10/2011 | Myer |
| 8,350,482 B2 | 1/2013 | Nevins |
| 8,588,830 B2 | 11/2013 | Meyer et al. |
| 2009/0237918 A1 | 9/2009 | Yang |
| 2009/0244881 A1* | 10/2009 | Butler ............................. 362/20 |
| 2009/0268441 A1 | 10/2009 | Chen |
| 2009/0273922 A1 | 11/2009 | Ho et al. |
| 2010/0220467 A1 | 9/2010 | Daidone |
| 2012/0020060 A1 | 1/2012 | Myer et al. |
| 2013/0021789 A1* | 1/2013 | Dahm ........................... 362/184 |

(Continued)

*Primary Examiner* — Britt D Hanley
*Assistant Examiner* — Jessica M Apenteng
(74) *Attorney, Agent, or Firm* — Patent Analysis Research Tech. Systems LLC; George L. Walton

(57) ABSTRACT

The present invention discloses an improved renewable energy and rechargeable LED lighting unit having a roadway/street light pole with a polygonal frame member configuration disposed there about. A plurality of solar panels affixed to the polygonal configuration. The solar panels include a plurality of electrical modules that are affixed directly to an interior wall of at least one of the solar panels without interfering with the polygonal frame member when attached. A two-part closure plate arrangement are attached directly to the polygonal frame member and completely enclose and seal the plurality of electrical modules between the frame member and the at least one of the solar panels.

20 Claims, 9 Drawing Sheets

(56) References Cited

U.S. PATENT DOCUMENTS

| | | | |
|---|---|---|---|
| 2013/0033867 A1* | 2/2013 | Coplin et al. | 362/245 |
| 2013/0240024 A1 | 9/2013 | Kim | |
| 2013/0322063 A1 | 12/2013 | Tittle | |
| 2014/0111098 A1 | 4/2014 | Amarin et al. | |

* cited by examiner

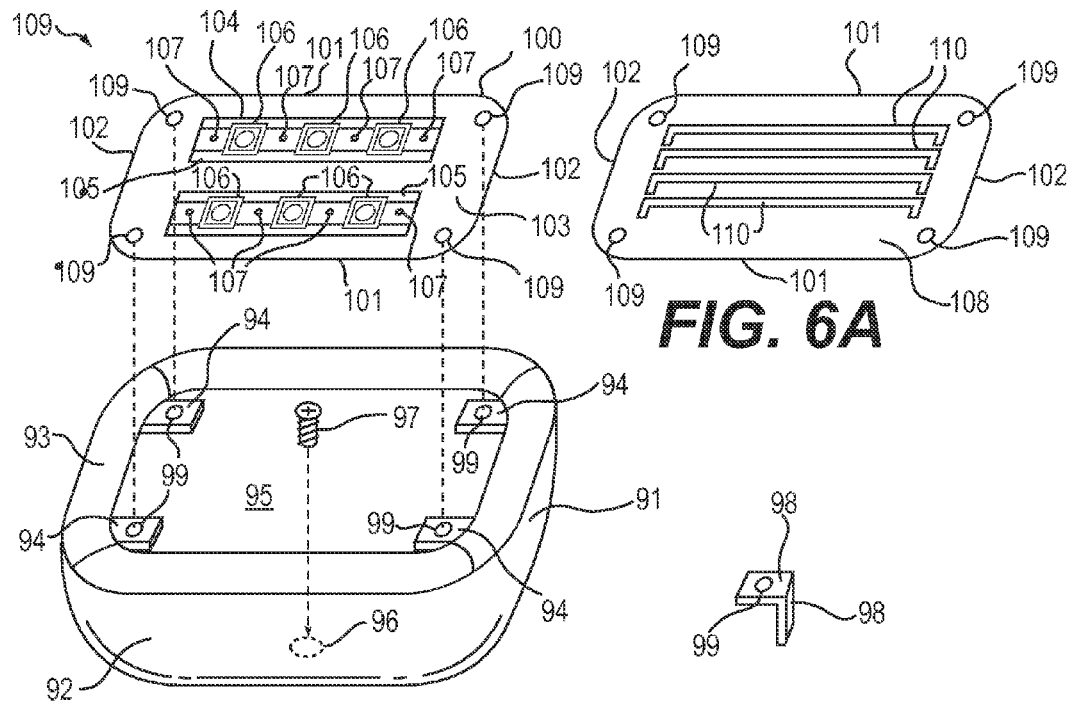
FIG. 6A
FIG. 6
FIG. 6B
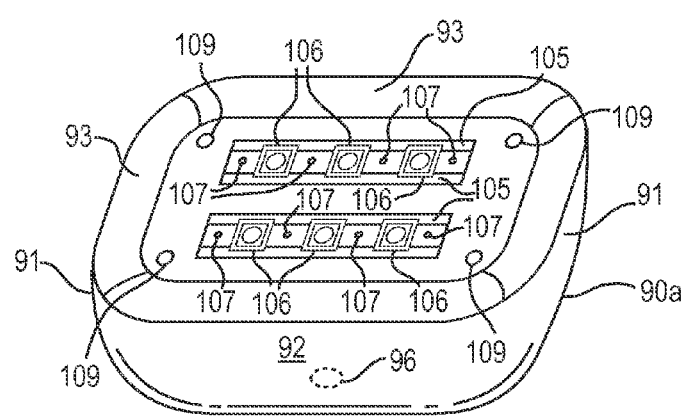
FIG. 6C

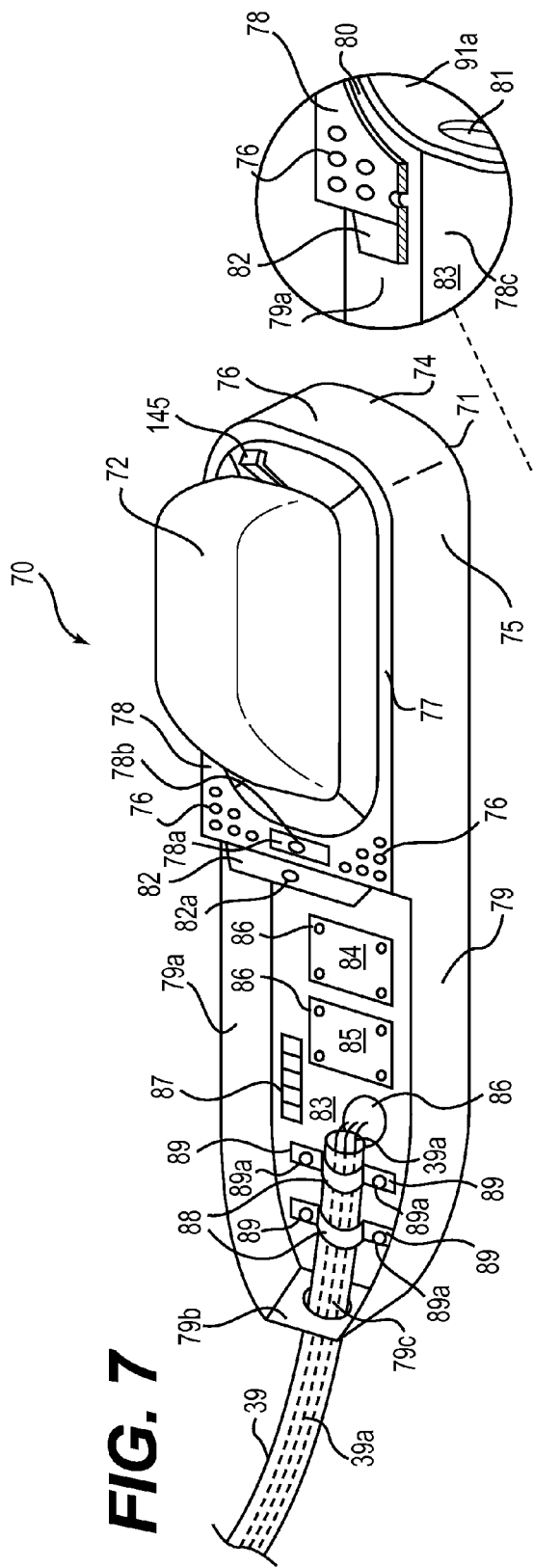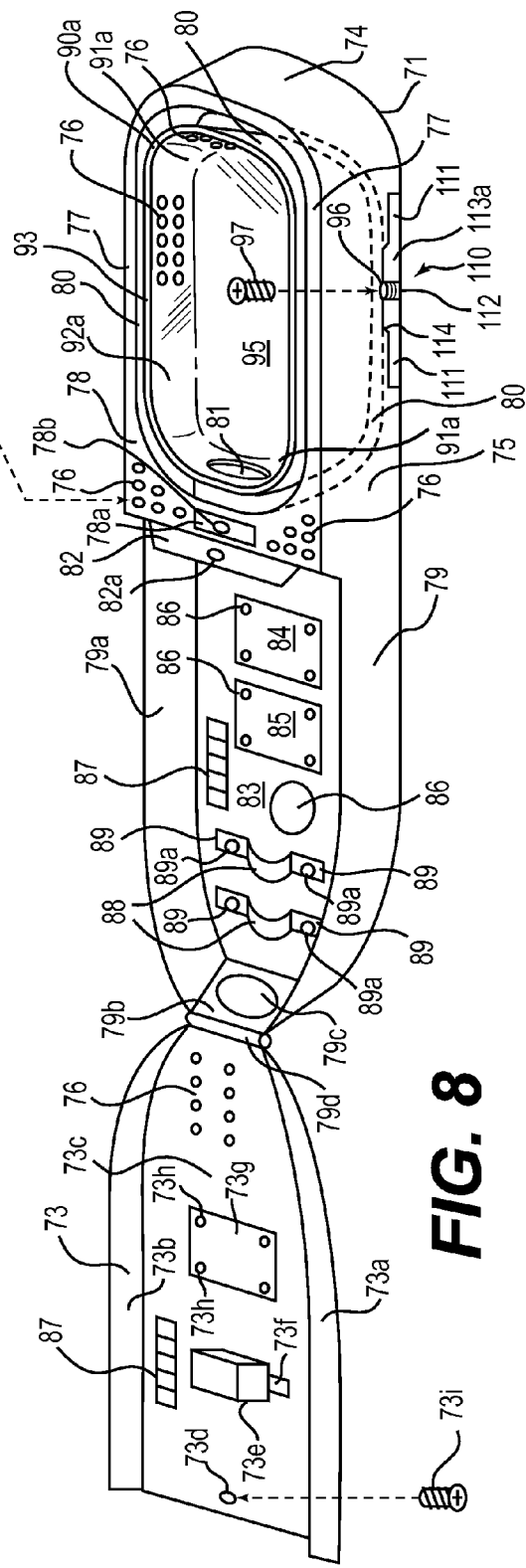

LED RENEWABLE ENERGY LIGHTING UNIT HAVING A POLYGONAL SOLAR PANEL CONFIGURATION ABOUT A HORIZONTAL OR VERTICAL POLE

CROSS REFERENCE TO RELATED APPLICATION(S)

This instant application claims priority to U.S. Provisional Patent Application Ser. No. 61/864,720, filed on Aug. 12, 2013.

BACKGROUND OF THE INVENTION

1. Field of the Invention

The present invention relates to a unique retrofit LED solar and wind powered rechargeable roadway/street light with solar panels disposed about a roadway/street light pole in a polygonal configuration. This polygonal configuration completely houses the controlling and management system electrical modules therein and being affixed to the interior of the solar panels in a compact manner as a unit that controls and manages the streetlight and a traffic light operation.

In addition, the unique LED solar and wind powered rechargeable roadway/street light has an improved heat dissipation feature for enhancing and extending the life cycle hours for the LED light source while simultaneously reducing the amount of power energy consumption used.

2. Description of the Related Art

At the present time, there are many different types of traditional (non-renewable) and solar and wind powered (renewable) lighting systems for general lighting needs to many users, such as public, private, residential, commercial and government use. Many of the non-renewable and renewable public and private lighting systems commonly utilize commercial power to supply energy for illuminating roadways/streets, property, parking lots, athletic fields, and the like. It is well known that non-renewable and renewable with retrofitted lighting such as those used in roadways/streets or security lights can amount to sizable costs over time, including substantial initial acquisition and installations costs of the equipment, and also the ongoing costs to pay for powering such non-renewable and renewable lighting. Note that the lighting source for illuminating roadways/streets, property, parking lots, athletic fields, and the like as indicated above, could be one from the group consisting of high-pressure mercury (HPM) arc lamps, metal halide lamps, high intensity discharge (HID) lamps, high pressure sodium (HPS) lamps, incandescent lamps, fluorescent lamps and light emitting diode (LED) lamps to name just a few.

These high cost non-renewable and renewable lighting systems are known to experience long commercial and utility power outage delays, where an affected geographical area is left completely in the dark. This is not unusual for a roadway/street, town or city, commercial or government facilities, homes, businesses to be left completely in the dark due to the loss of commercial and utility power.

Also, there is a need to enhance and prolong the life cycle hours of the lighting source, which is shorten by the excessive heat generated over time with no effective way of dissipating the heat in the above mentioned high cost non-renewable and renewable lighting systems. This causes a user to spend a lot of money replacing bulbs or lamps often. Also, it is noted many of these non-renewable and renewable light systems provide very dim lighting.

Therefore, there is a tremendous need for an improved lighting device that avoids all of the aforementioned drawbacks and limitations of the non-renewable and renewable public and private lighting systems.

The prior art patents recited below discloses wind and/or solar-powered light apparatuses for self-generation of power with information and management systems and having solar panels arranged about a pole having different configurations with at least one patent showing the solar panels being arranged in different polygonal configurations.

Note that these wind and/or solar-powered light apparatuses take on many different designs and structures, which are disclosed and described in U.S. Pat. Nos. 4,200,904 A, 7,731, 383 B2, 7,976,180 B1, 8,007,124 B2, 8,029,154 B2, 8,350, 482 B2, 8,588,830 B2, 2009/0237918 A1, 2009/0268441 A1, 2009/0273922 A1, 2010/0220467 A1, 2012/0020060 A1, 2013/0240024 A1, 2013/0322063 A1 and 2014/0111098 A1, to name just a few of interest. However, they do not singly or in any combination teach the claimed invention.

SUMMARY OF THE INVENTION

The present invention discloses an improved solar and wind powered LED retrofit lighting system with plural solar panels arranged in a polygonal configuration about lighting pole for illumination, power generation and/or for operation of traffic light systems. The polygonal solar configuration includes all of the electrical modules for operating the improved solar and wind powered LED retrofit lighting system, which are affixed thereto and completely housed and sealed therein. This polygonal arrangement provides the capability of being scalable in small foot print of a 250 watts solar panel space that will produce from 600 to over 1200 watts from the solar panels. Such is a great benefit for limited land space. It is to be noted that the improved solar and wind powered LED retrofit lighting system with the polygonal solar panel arrangement is known as the "Revolutionary Energy Savings Technology", hereinafter referred to as REST.

This arrangement allows the improved solar and wind powered retrofit lighting system to produce power for 5 to 8 hours to charge battery banks that is used to power an inverter and power LED street light lamps for 12 hours at night. Also, this polygonal configuration will help to greatly reduce the amount of fuel used by a power or utility company to generate electricity and grid power. Also, this polygonal arrangement can be installed on utility poles or in a solar farm.

A further aspect of the present invention provides a polygonal frame for securing the required number of solar panels thereto. The frame includes top and bottom plates for closing and completely sealing the polygonal frame. These plates are split in half with semi-circular grooves to fit and mate around a utility pole as a unit. A plurality of securing holes and screws are placed about the peripheral edges of the split plates to be affixed to the peripheral edges of the top and bottom of the polygonal frame through securing holes therein.

A further aspect of the present invention provides a pair of C-shaped clamps with outward extending flanges there from is attached to the top of the pair of half plates at the semi-circular grooves thereof. Note that the C-shaped clamps include a semi-circular groove to be disposed at and above the semi-circular grooves of the half plates. Each of the semi-circular grooves of the C-shaped clamps includes a sealing gasket disposed and sandwiched therein to seal around the utility pole to prevent any water from seeping around the pole and damaging the electronic components that are affixed to the solar panels. Also, each of the C-shaped outward extending flanges include a screw opening therein for receiving a screw member there through to squeeze and seal the gasket about the utility pole when the screws are tightened. A tightening nut can be disposed on the screws to tighten the flanges and gasket about the utility pole for always maintaining a tight and effective seal thereabout.

Another aspect of the present invention provides at least a pair of ¼ inch mounting plates disposed between at least a pair of mating frame members adjacent to the top and bottom portions thereof. These mounting plates are welded between and along the sidewalls thereof and the frame engaged interior wall surfaces. Each of the at least a pair of ¼ inch mounting plates includes a semi-circular groove with a first C-shaped clamp with outward extending flanges with a securing opening for receiving a screw member. Note that the first C-shaped clamps are welded within the mounting plates' semi-circular grooves. If desired, the center of the first C-shaped clamps of the mounting plates could receive screw member to further secure them therein.

Also, a seam weld is disposed along corner edges of the frame walls to secure them together. At least a backing member is attached to the frame walls by a plurality of peripheral edge screw members.

Note that the first C-shaped clamps of the mounting plates are disposed about a utility pole to mate and cooperate with the second C-shaped clamps disposed on an opposite side of the utility pole. At least a first sealing gasket is inserted between the first C-shaped clamps of the mounting plates and the utility pole to further prevent any water from seeping around the pole and damaging the electronic modules that is affixed to the solar panels. Also, the second C-shaped clamps includes a center screw hole for receiving a center screw member to be screwed into the utility pole for always maintaining the second C-shaped clamps tightly secured about the utility pole and the first at all times, as well with the first C-shaped clamps of the mounting plates.

Further, in according to the present invention, a new and innovative heat dissipation design is hereby provided to enable longer operating hours for LED chips.

This new and innovative heat dissipation design includes a polished aluminum basin with an upper outer rim (flange) at the very top thereof with four corners. The four corners having four right angle aluminum support brackets attached thereto and mounted inside of the polish aluminum basin just below the upper outer rim. In addition, the polished aluminum basin is secured to an upper interior wall section of the outer die cast shell with a preferred 5×6 inch aluminum plate being sandwiched there between by a screw through an upper middle wall area or section of the polished aluminum basin through an opening in the preferred 5×6 inch aluminum plate via a molded securing nut and into the upper interior wall section of the outer die cast shell to achieve additional heat dissipation. The aluminum plate has a larger intermediate section with two smaller outward extending ends connected by a pair of incline portions there between.

The new and innovative heat dissipation design further includes a heat sink plate with at least a pair of screw holes at each corner of the heat sink plate to receive the screws. This allows the heat sink plate to seat on top of the four right angle aluminum support brackets to create a large space or inner chamber below the heat sink plate to allow a large volume of ambient air to constantly circulate under the LED chips and vent or transfer heat from the heat sink plate rapidly there from to the large space or chamber above the heat sink plate of the polished aluminum basin.

Also, the LED chips are mounted on top of the aluminum heat sink plate secured by a plurality of screws using heat sink compound to help with the heat transfer process from the base of the LED chips. At the bottom of the aluminum heat sink plate a plurality of spaced fins extend downwardly there from into an upper portion of the polished aluminum basin near the bottom rim and secured by screws horizontally and using heat compound to increase the heat transfer from the heat sink plate to the spaced aluminum fins in the middle close to each LED chip. These fins are used to remove heat with ambient air flow in the inner chamber of the polish aluminum basin.

The polished aluminum basin has an open space in the rear thereof and vent holes in the front, rear and sides to enable ambient air to constantly circulate ambient air flow from the large space or inner chamber and exit to the outside of the basin and allowing ambient air to flow to the outside through a plurality of vent holes of the outer die cast shell and via a plurality of vent holes in a rear cover. A continuous flow passage formed between the outer die cast shell and the aluminum polished basin to constantly circulate ambient air about the aluminum polished basin to preserve the life cycle of the LED chips.

Additional aspects, objectives, features and advantages of the present invention will become better understood with regard to the following description and the appended claims of the preferred embodiments with reference to the accompanying drawings.

BRIEF DESCRIPTION OF THE DRAWINGS

The present invention may be better understood, along with its numerous objects, features, and advantages made apparent to those skilled in the art by referencing the accompanying drawings.

FIG. 4A illustrates a rear view of one of the sides of the polygonal solar panels with electrical components affixed thereto according to the present invention.

FIG. 4B illustrates a rear view of the back solar panel with electrical components affixed thereto according to the present invention.

FIG. 6 illustrates an exploded view of the polished aluminum basin and heat sink plate with the LED chips disposed thereon according to the present invention.

FIG. 6A illustrates a bottom view of the heat sink plate with heat transfer fins disposed thereon according to the present invention.

FIG. 6B illustrates a perspective view of the right angle support bracket for the heat sink plate according to the present invention.

FIG. 6C illustrates a perspective view of the polished aluminum basin and heat sink plate with the LED chips secured together as a unit according to the present invention.

FIG. 7 illustrates a perspective bottom view of the lighting unit with electrical components and camera device according to the present invention.

FIG. 8 illustrates a perspective bottom view of the lighting unit with hinge cover, electrical components, heat dissipation elements and camera device according to the present invention.

DETAILED DESCRIPTION

Figure 1:
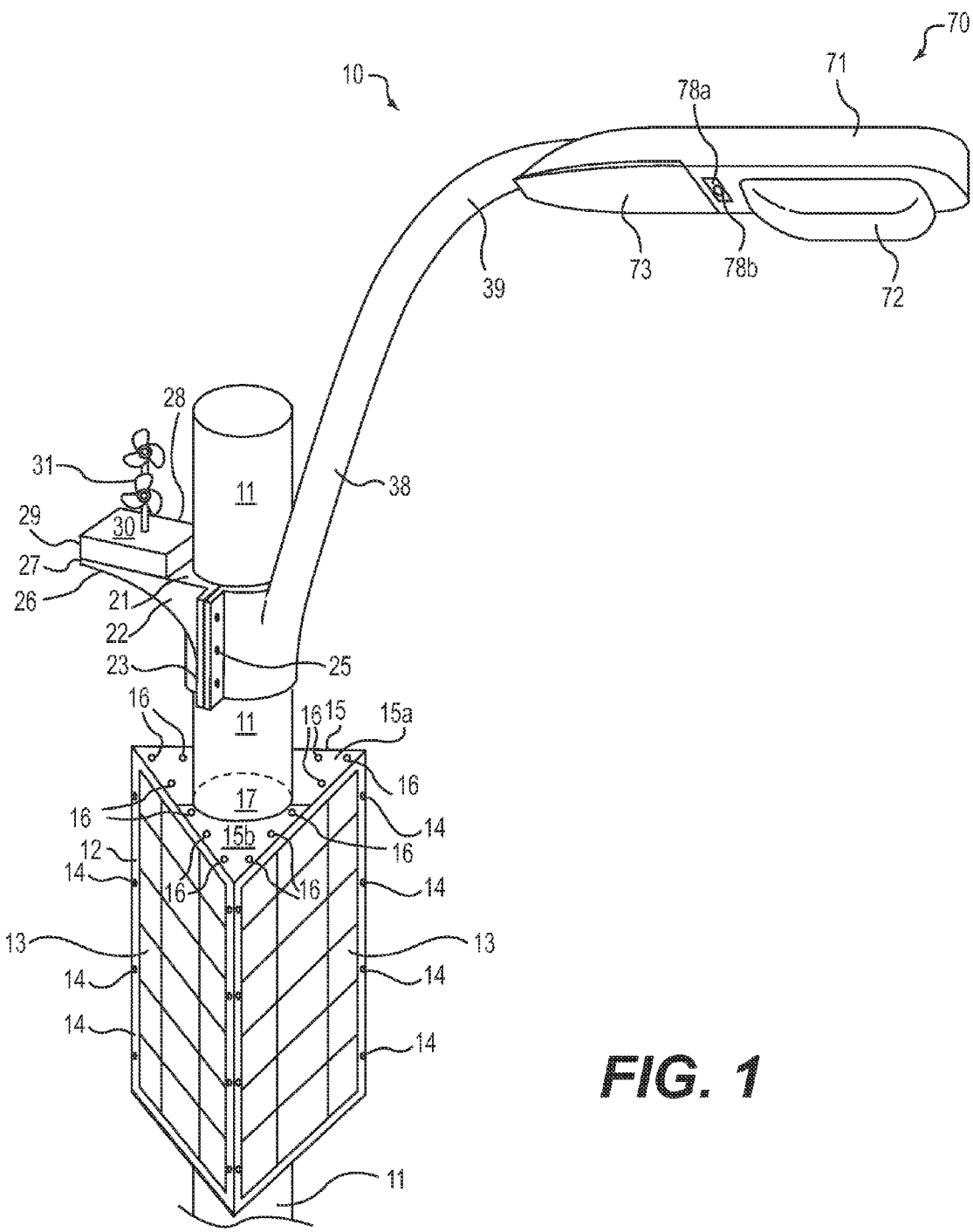
FIG. 1 illustrates a perspective view of the solar and wind powered street/roadway lighting apparatus with solar panels configured in a polygonal configuration according to the present invention.

FIG. 1 illustrates a perspective view of the solar and wind powered street/roadway lighting apparatus 10 with solar panels 12 configured in a polygonal configuration according to the present invention. The polygonal configuration can be selected from the group consisting of any one of a triangle, quadrilateral, pentagon, hexagon, heptagon, octagon, enneagon, decagon, squares, rectangles, parallelograms and rhombuses. The preferred polygonal shape of the present invention is an isosceles triangle.

Figure 3:
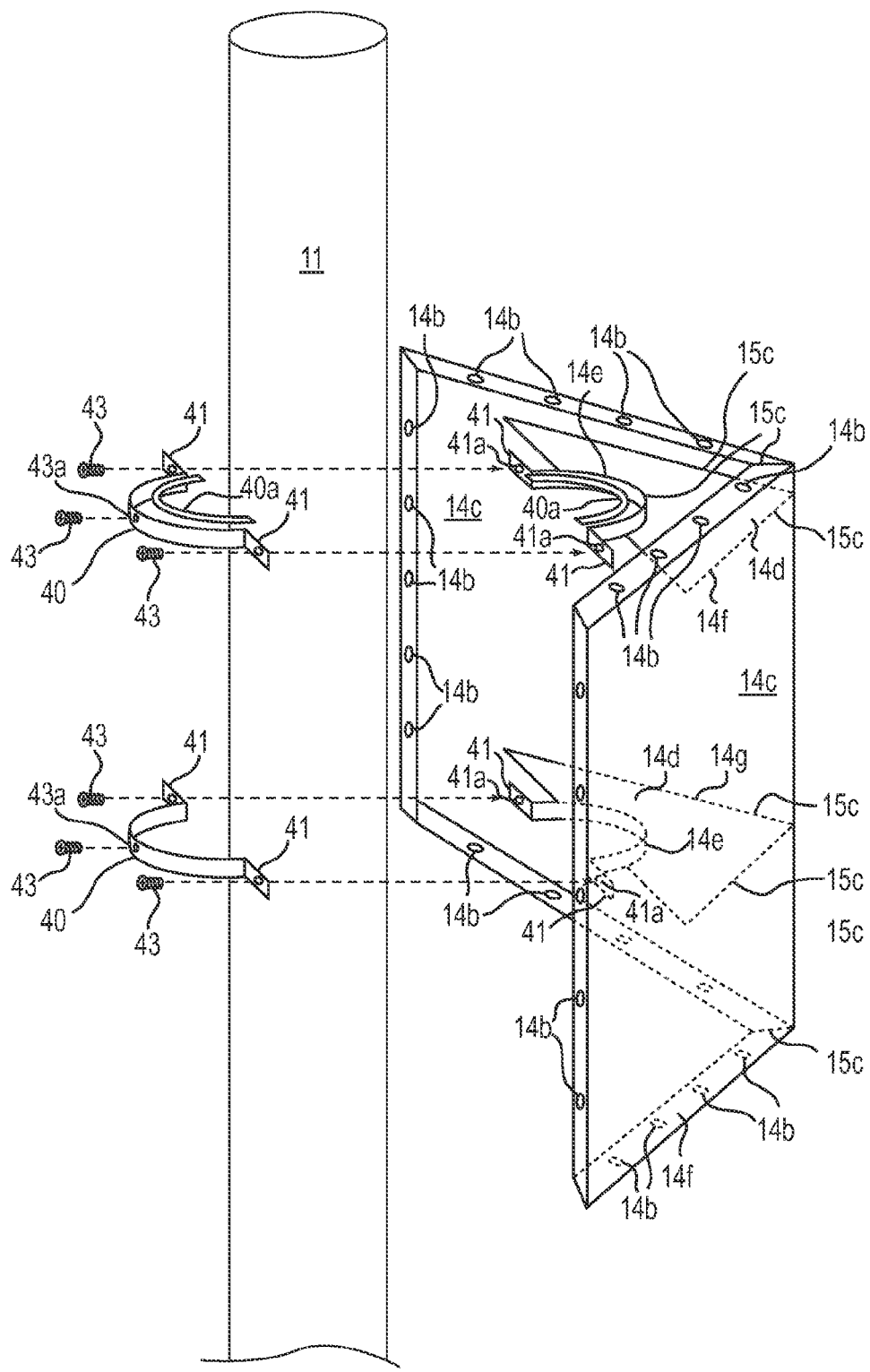
FIG. 3 illustrates an isometric view of the polygonal solar panel frame with upper and lower C-shaped securing clamps about a utility pole according to the present invention.
Figure 5:
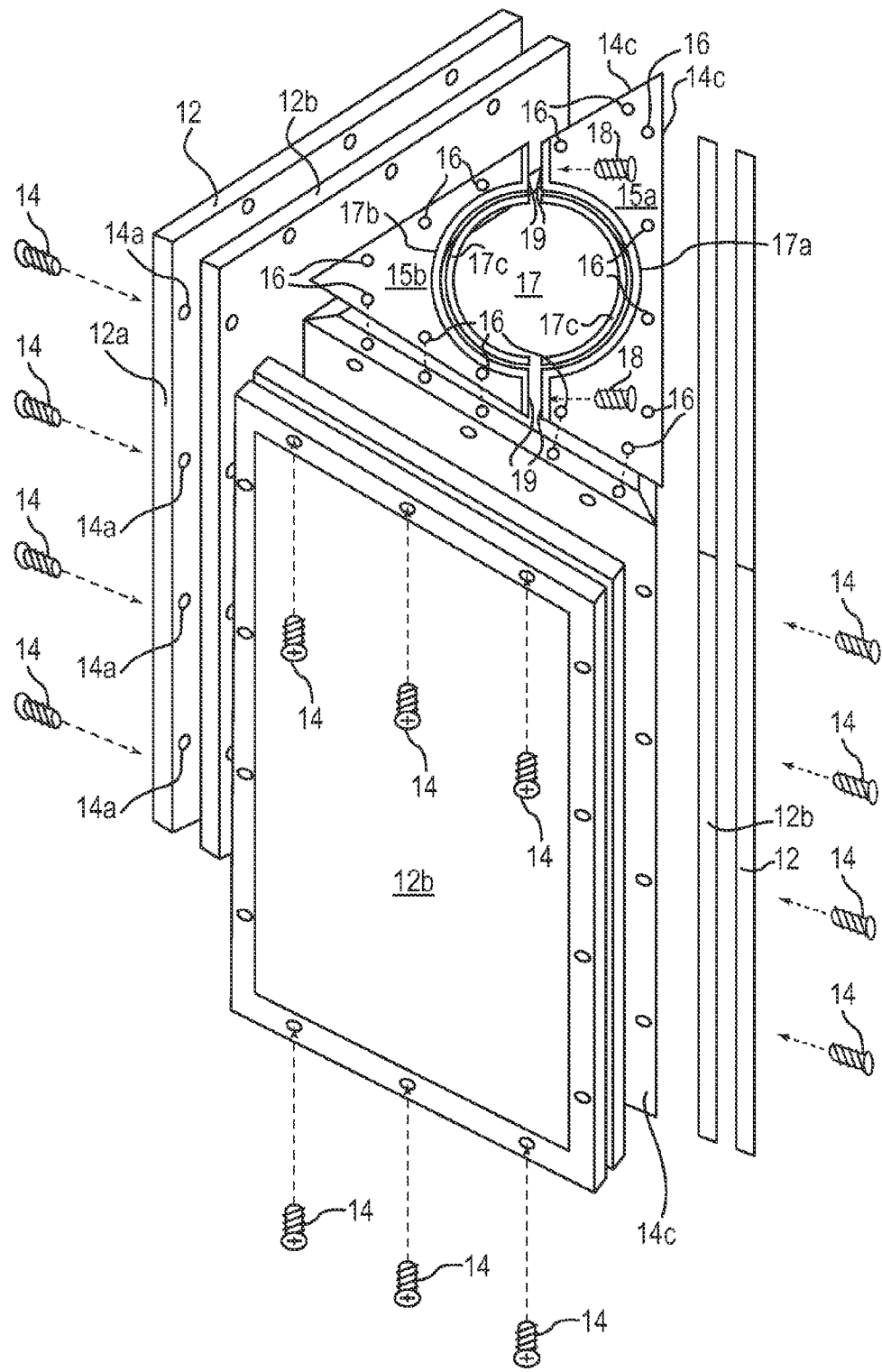
FIG. 5 illustrates an exploded isometric view of the polygonal frame with cooperating sealing gaskets and solar panels according to the present invention.

The solar and wind powered street/roadway lighting apparatus 10 is disposed about a utility or street light pole 11. As shown in FIG. 1, a plurality of solar panels 12 with solar cells 13 affixed thereto. These solar panels 12 with solar cells 13 secured to a polygonal support frame 14C as illustrated in FIGS. 3 and 5. A top plate with two-part halves 15a and 15b are secured to the top of the polygonal support frame 14C by screw members 16.

Note that the solar panels 12 with the solar cells 13 can comprise a plurality of photovoltaic cells such as a thin-film photovoltaic material attached thereto.

FIG. 1 further shows a mounting bracket unit 20 that supports a lighting unit 70 and a wind turbine 31. The bracket unit 20 has a U-shaped brace member 36 disposed about the pole 11 and attached thereto by screw members 25 through a flange member 24. The U-shaped brace member 36 includes a utility pole support mounting pipe with a lower end portion 38 and an upper end 39 that extends and is secured to the lighting unit 70. The wind turbine 31 includes a mating U-shaped clamp 27 with a top support surface 30 that secures the wind turbine 31 thereto. The U-shaped clamp 27 is mounted to the top of U-shaped clamp 36. The top support surface includes semi-circular groove 21 for fitting around the utility/street light pole 11.

A side wall portion 22 extending downward into a flange member 23 that abuts flange member 24 of the U-shaped brace member 36 to secure them together with screw members 25. This will bolt the wind turbine 31 and the U-shaped brace member 36 together as a unit. The support surface 30 has a pair of sides 28 and a front end face 29. The side wall portion 22 decreases in thickness from the flange 24 to the front end 26.

The utility pole mounting pipe 39 is secured into the space that is closed by the lighting unit 70 by cover member 73 at the rear end thereof. A forward portion of the lighting unit 70 has side wall portions 71, lens 72, and the camera 78a with the camera eye 78b. Further details of the lighting unit 70 will be discussed later in FIGS. 7 and 8.

Figure 2:
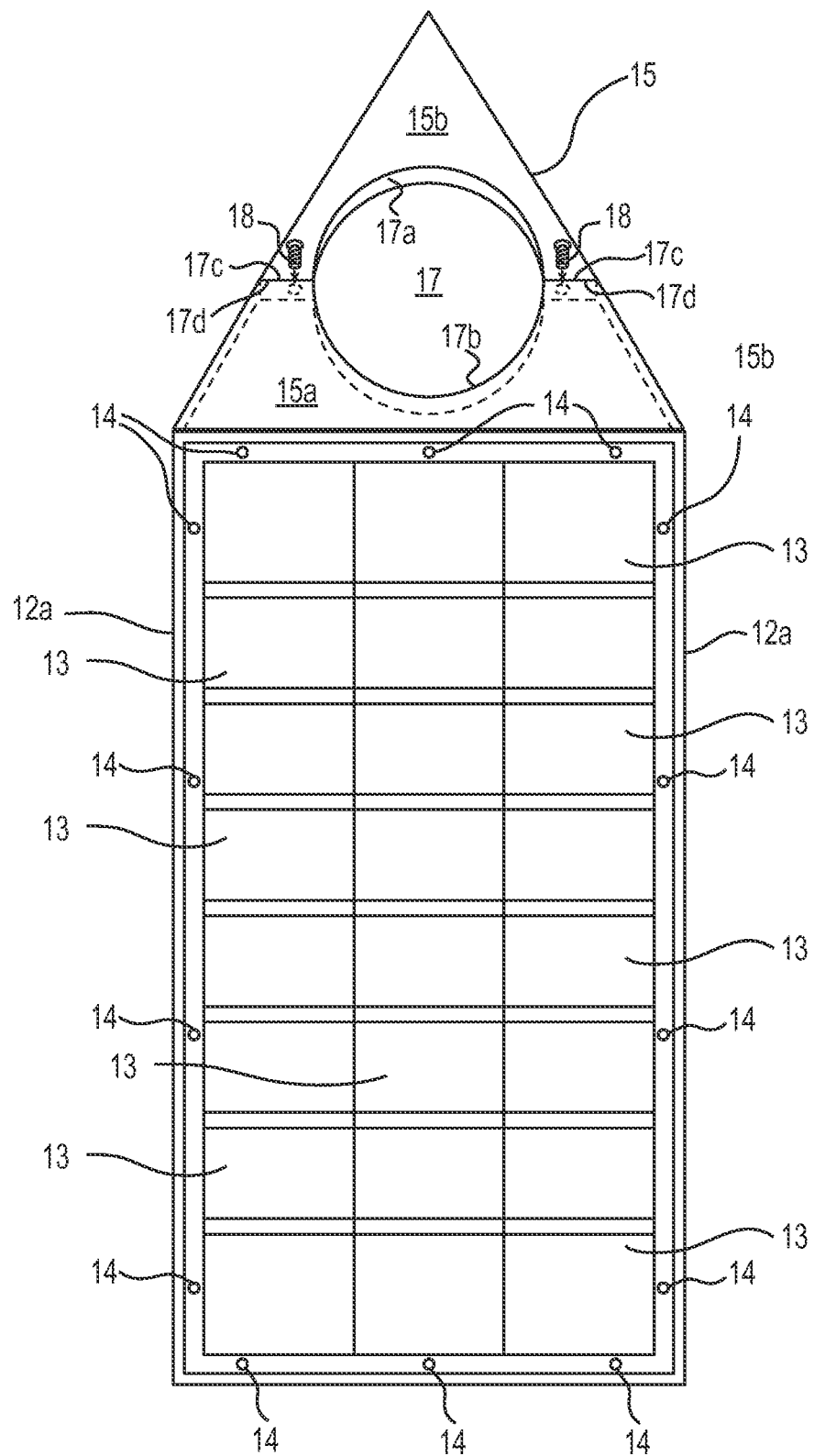
FIG. 2 illustrates a rear view of the solar and wind powered street/roadway lighting apparatus with solar panels configured in a polygonal configuration according to the present invention.

Referring to FIG. 2, this illustrates the back solar panel 12 with solar cells mounted to the polygonal frame 14c by the plurality of screws 14. The top two-part plate halves 15a and 15b are secured to polygonal frame 14c. Also, the two-part plate halves 15a and 15b include a pair of C-shaped brackets 17a and 17b at the top thereof and being secured thereto by a weld means. Elements 17c and 17d receive screw 18 for securing the C-shaped brackets 17a and 17b about the opening 17.

FIG. 3 shows the polygonal frame includes two side members 14c with sides 14f and 14g, which are welded to the side members 14c by weld 15c. Also, the weld 15c is disposed between the edges of side members 14c at the apex where the apex ends are angle to mate with one another. The two side members 14c includes a semi-circular groove 14c that receives first C-shaped clamps with outward extending flanges 41 that receives screws 43 through screw openings 41a and held therein by a weld 15c. The top first C-shaped clamp has a sealing gasket disposed within the semi-circular groove to seal about the utility/street light pole to prevent any water from leaking along the utility/street light pole and into the polygonal frame housing and causing damage to the electronic components affixed to the solar panels.

Note that screw openings 14b receives screw members 14 to secure the top and bottom plate halves 15a and 15b and the back frame plate 14c thereto.

Second C-shaped clamps with outward extending flanges 41 are disposed about the utility/street roadway pole 11 that receives screws 43 through screw openings 41 and held into abutting engagement with the first. C-shaped clamp flanges 41. Also, the second C-shaped clamps include semi-circular grooves therein for receiving the utility/street roadway pole 11, with the top second C-shaped clamp having a second sealing disposed therein to prevent any water from leaking along the utility/street light pole and into the polygonal frame housing and causing damage to the electronic modules affixed to the solar panels. Each of the second C-shaped clamps has a center screw member 43 that is screwed into the center of the utility/street roadway pole 11 to enhance the securing of the second C-shaped clamps about the utility/street roadway pole 11.

Figure 4:
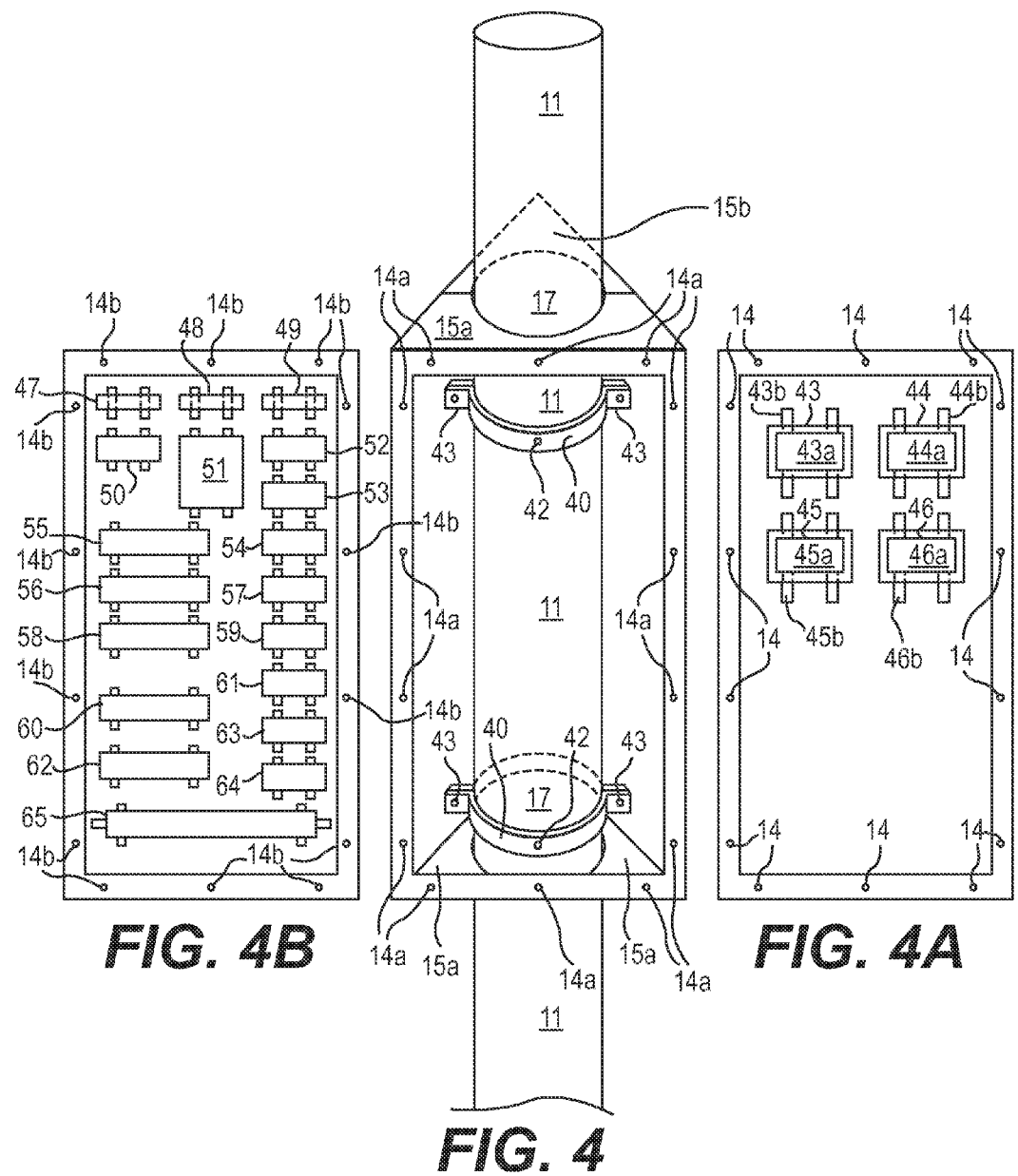
FIG. 4 illustrates a rear view of the solar and wind powered street/roadway lighting apparatus with solar panels configured in a polygonal configuration with back solar panel being removed according to the present invention.

FIG. 4 illustrates a rear view of the solar and wind powered street/roadway lighting apparatus 10 with solar panels 12 configured in a polygonal configuration with a back solar panel 12 being removed. It also shows the first and second C-shaped clamps 40 secured about the utility/street roadway pole 11. Also, it shows the top and bottom two-part half plates 15a and 15b closing the top and bottom of the polygonal frame 14c.

FIG. 4A shows a side solar panel 12 with cut-outs 43-46. Cut-out 43 receives Charge Controller No. 1 therein, which is represented by element 43a with clamping means 43b for retaining it within the cut-out 43. Cut-out 44 receives Charge Controller No. 2 therein with clamping means 44b for retaining it within the cut-out 44. Cut-out 45 receives Battery No. 1 therein, which is represented by element 45a with clamping means 45b for retaining it within the cut-out 45. Cut-out 46 receives a Battery No. 2 therein, which is represented by element 46a with clamping means 46b for retaining it within the cut-out 46.

FIG. 4B shows a plurality of electrical components disposed on an interior wall of the solar panel 12. Each of these elements will be described below.

1. Element 47 represents a Wind Charger;
2. Element 48 represents a Solar Charger Controller;
3. Element 49 represents Battery No. 3;
4. Element 50 represents a Connector Unit for Power from other Solar Panels and Battery;
5. Element 51 represents a Power Sharing and Isolating Unit;
6. Element 52 represents a Grid Power Unit;

7. Element 53 represents a Day Light Sensor;
8. Element 54 represents a Grid Power Supply Unit;
9. Element 55 represents a Battery and LED Control;
10. Element 56 represents a Battery, Camera/WIFI and RF Unit;;
11. Element 57 represents a LED Control Circuit Unit;
12. Element 58 represents a Battery and Traffic Grid;
13. Element 59 represents an Occupancy Sensor;
14. Element 60 represents a Traffic Light Inverter Unit;
15. Element 61 represents a Power Supply for Camera/WIFI;
16. Element 62 represents a Grid Inverter Unit;
17. Element 63 represents a WIFI and RF Unit;
18. Element 64 represents a LED Cluster Control; and
19. Element 65 represents a Connector Panel for outside components, such as internet, WIFI antenna, power to grid, traffic light, remote Ethernet connection for camera/video system, remote control capability and USB for cellular phone charging station.

FIG. 5 illustrates an exploded isometric view of the polygonal frame with cooperating sealing gaskets and solar panels spaced there from. This FIG. shows the top plate with a pair of C-shaped securing clamps 17a, 17b with outward extending flanges 19 and disposed at the top of the two-part half plates, which is welded thereto about the utility/street or roadway pole opening 17. Each of the C-shaped securing clamps 17a, 17b include a sealing gasket 17c that is received in semi-circular grooves of the C-shaped securing clamps 17a, 17b. A screw member 18 extends through flanges 19 to tighten the C-shaped securing clamps 17a, 17b and squeeze the sealing gasket 17c in a tight sealing relationship with the utility/street or roadway pole 11 (not shown). This sealing engagement will prevent any water from leaking past and along the pole and against any damage of the electrical components 43-65 affixed to the solar panels 12. Screw holes 16 receives screw member not shown for affixing the two-part plate halves to the top of the polygonal frame 14c.

Also, FIG. 5 shows an additional sealing gasket 12b disposed between the frame 14c and the solar panel 12 for sealing the sealing components of the solar modules 43-65. Screw elements 14 are inserted through screw holes 14a to secure the solar panels and the sealing gaskets to the polygonal frame 14c.

FIG. 6 shows an exploded view of the new and innovative heat dissipation design that includes a heat sink plate 103 with at least a pair of screw holes 109 at each corner of the heat sink plate 103 to receive screws (not shown). This allows the heat sink plate 103 to seat on four right angle aluminum support brackets 94 having an L-shape configuration, which is disposed and secured at each corner of the polished aluminum basin 90a just above a lower annular rim portion 93 thereof to create a large space or chamber 95 above the heat sink plate 103 to allow a large volume of ambient air to constantly circulate above the LED chips 106 and vent or transfer heat from the heat sink plate 103 rapidly there from to the large space or chamber 95 above the heat sink plate 103 of the polished aluminum basin 90a. As shown in FIG. 6, the polished aluminum basin 90a includes a pair of outer sides 92 and a front and rear sides 91.

A screw hole 96 is disposed near the bottom of the polished aluminum basin 90a to receive screw 97 to secure it to the outer die cast shell 71 through screw opening 112 of a heat transfer and dissipation plate 110 as shown in FIGS. 7 and 8, which will be discussed in greater details later. Elements 105 represent the LED chip circuit board. Note that copper track (land) is disposed on the circuit board 105 and covered with high temperature white paint for insulation and used also as a reflector. The white paint on the surface of the heat sink plate 103 guards the circuit board 105 against exposure to water and /or moisture.

Also, the LED chips 106 are mounted on top of the aluminum heat sink plate 103 secured by a plurality of screws 107, which uses heat sink compound to help with the heat transfer process from the base of the LED chips 106.

In FIG. 6A, the bottom of the aluminum heat sink plate 103 having a plurality of spaced fins 110 secured by screws horizontally and using heat compound to increase the heat transfer from the heat sink plate 103 to the spaced aluminum fins 110 in the middle close to each LED chip 106. These fins are used to remove heat with ambient air flow in the inner chamber 95 of the polished aluminum basin 90a.

FIG. 6B shows the right angle anchor support brackets 94 with right angle legs 98 with a screw opening 99 in at least one of the legs 98.

Also, the LED chips 106 are mounted on top the aluminum heat sink plate 103 secured by a plurality of screws 107, which uses heat sink compound to help with the heat transfer process from the base of the LED chips 106.

FIG. 6C is the same as FIG. 6, except that is secured together as unit. Since the elements are the same, it would be redundant to recite the same elements as indicated in FIG. 6 above. The bottom portion of the polished aluminum basin 90a shows the rim portion 93 of the heat sink plate 103 being fixed just above the rim portion 93, since the right angle support brackets 94 are disposed and secured right above the rim portion 93 to established the aforementioned large space or chamber 95. This aforementioned large space or chamber 95 helps to protect the LED chips from damage and preserving their life cycle.

In FIG. 7, the REST LED retrofit lighting system unit 70, is further being branded as the "NIGHT STAR™" , which is a pending trademark, includes an outer die cast shell 71 with a front portion 74, a side wall portion 75, and a top wall ledge portion 77 with vent openings 76 in a rear lower middle wall portion 78. The rear lower middle wall portion 78 includes a plurality of vent openings 76 on opposite sides thereof, with a camera device 78b positioned there between. The camera device 78b can be represented by a camera eye or lens. A LED lens cover 72 is disposed between the front portion 74 and the rear lower wall portion 78. The cover 72 is pivotally disposed over the aluminum polished basin 90a to completely close and seal it (See FIG. 7).

Also, the "NIGHT STAR™" LED retrofit lighting unit 70 has an outer wall portion 79 and an inner wall portion 79a at a rear section of the outer die cast shell 71, which extends and is connected between the rear lower middle wall portion 78 to a rear wall portion 79b. An upper top closed ceiling portion 83 has electronic components affixed thereto. Element 84 represents WIFI RF Transmitter with securing screws 86 and element 85 represents the Camera Power Supply with securing screws 86. Also, element 86 represents the Day Light Sensor Socket and element 87 represents Barrier Strips for interconnecting crimp wire connectors. The element 39, which is the utility pole mounting pipe with wiring 39a connected to utility power at one end and the other end is connected to the barrier strip 87. The C-clamps 88 having securing flanges with securing means 89a for securing the utility pole mounting pipe 39 within the space defined by the upper top ceiling portion 83. The utility pole mounting pipe 39 is inserted through a rear opening 79c of the rear wall portion 79b and into the upper top closed ceiling portion 83 and secured therein by the aforementioned C-clamps 88 and securing means 89a.

In a middle portion behind the rear lower wall portion 78 is a flange portion 82 with a locking screw opening 82a for locking a bottom cover 73 thereto (See FIG. 8). The cover 73 is pivotally hinged at 79d at a bottom end of the rear wall portion 79 of a rear section of the outer die cast shell 71 that extends between the rear lower middle wall portion 78 and the rear wall portion 79 to close and completely seal the electronic components affixed to the upper top closed ceiling portion 83 therein to protect against damage and moisture. Above the flange portion 82 is an open ambient air space or area 78c (see the exploded cut-out section of FIG. 8) for circulation of ambient air to the aluminum polished basin 90a through an annular space or channel 80 between the exterior of the polished aluminum basin 90a and the interior of the outer die cast shell 71 and an ambient air opening or passage in the rear side wall portion 91 of the polished aluminum basin 90a.

A spring type locking latch 145 for latching the lens cover 72 between open and closed positions. Other types of latches could be utilized, if desired.

In regards to FIG. 8, many of the elements will not be repeated, since it would be redundant. Only those elements will be discussed that are not shown in FIG. 7. Note that the polished aluminum basin 90a includes the large space or chamber 95, the annular space or channel 80 between the polished aluminum basin 90a and an interior wall (not shown) of the outer die cast shell 71 below the top wall ledge portion 77 to circulate ambient air through vent openings 76 in the rear lower middle wall portion 78 and into the large chamber 95 of the polished aluminum basin 90a under the LED chips and around the polished aluminum basin 90a through channel 80. The ambient air is first entered into a plurality of vent holes 76 disposed in a bottom wall surface portion 73c of the cover 73 and into the open ambient air space 78c (see the exploded cut-out section of FIG. 8) above the flange portion 82 and the rear lower middle wall portion 78, which continues to circulate flow into the annular channel 80 and through the plurality of vent openings 76 in the outer front side wall portion 91 and the outer rear side wall portion 91 and through inner front and rear side wall portions 91a and through outer side wall portions 92 and inner side wall portions 92a into the large chamber 95 to constantly dissipate heat to enhance the life cycle of the LED chips 106.

Note that the open space 78c 9as shown in the exploded cut-out section of FIG. 8 will also allow ambient air to constantly flow into the annular space or channel 80 and through an ambient air passage 81 disposed in the outer and inner rear wall portions 91, 91a and into the large space or chamber 95. This ambient air flow will flow through and above the rear lower wall portion 78 and the plurality of vent holes disposed therein and through the plurality of vent holes 76 in the front and side wall portions 91, 91a and 92, 92a to enable ambient air to constantly circulate and exit there from to dissipate heated ambient air flow from the large space or chamber 95 to the outside of the basin 90a through the annular space or channel 80 and through the plurality of vent holes 76 in the bottom wall surface portion 73c of the cover 73 and the plurality of vent holes 76 in the rear lower middle wall portion 78 via open space 78c to the exterior of the outer die cast shell 71 to protect the LED chips from damage, while simultaneously enhancing their life cycle. It is noted that the open space 78c is also defined by the bottom wall surface portion 73c of the cover 73 and the upper top closed ceiling portion 83 of the outer die cast shell 71 rear section defined by elements 79, 79a, 79b and 79c when the cover 73 is closed.

Since the outer rim (flange) of the heat sink plate 103 is mounted on the right angle aluminum brackets 94 (FIG. 6) mounted inside of the polish aluminum basin 90a to allow an increase of rapid transfer heat from heat sink plate 103 to the large polish aluminum basin chamber 95. In addition, the polish aluminum basin has a preferred 5×6 inch aluminum plate 110, which can be of different dimensions, if desired, and sandwiched between the aluminum basin 90a along a top outer surface thereof and into abutting engagement with a top inner side wall surface of the outer die cast shell 71 for additional heat transfer and dissipation to further enhance the life cycle of the LED chips 106.

The preferred aluminum plate 110 has a larger intermediate section 113a with two smaller outward extending ends 111 connected by a pair of incline portions 114 there between and is secured from the inside of the aluminum basin 90a at an upper wall section thereof to the outer die cast shell 71 at an upper wall section thereof and through screw opening 112 disposed in the intermediate section 113a of the aluminum plate 110 and into engagement with the outer die cast shell 71 by the screw 97 that is first inserted through screw opening 96 of the aluminum basin 90a.

Further in FIG. 8, the cover 73 will now be described. The cover 73 has an outer wall portion 73a, an inner wall portion 73b and upper ceiling wall 73c. The ceiling wall has a plurality of vent openings 76, a Power Supply Module 73g with securing screws 73h, a Power Transformer 73e with a securing screw flange 73f and a Barrier Strip 87 (See FIG. 7 above for details). Element 73d is a locking screw hole for receiving the locking screw 73i to engage the flange locking screw hole 82a for locking the cover closed to the lighting unit 70.

Figure 9:
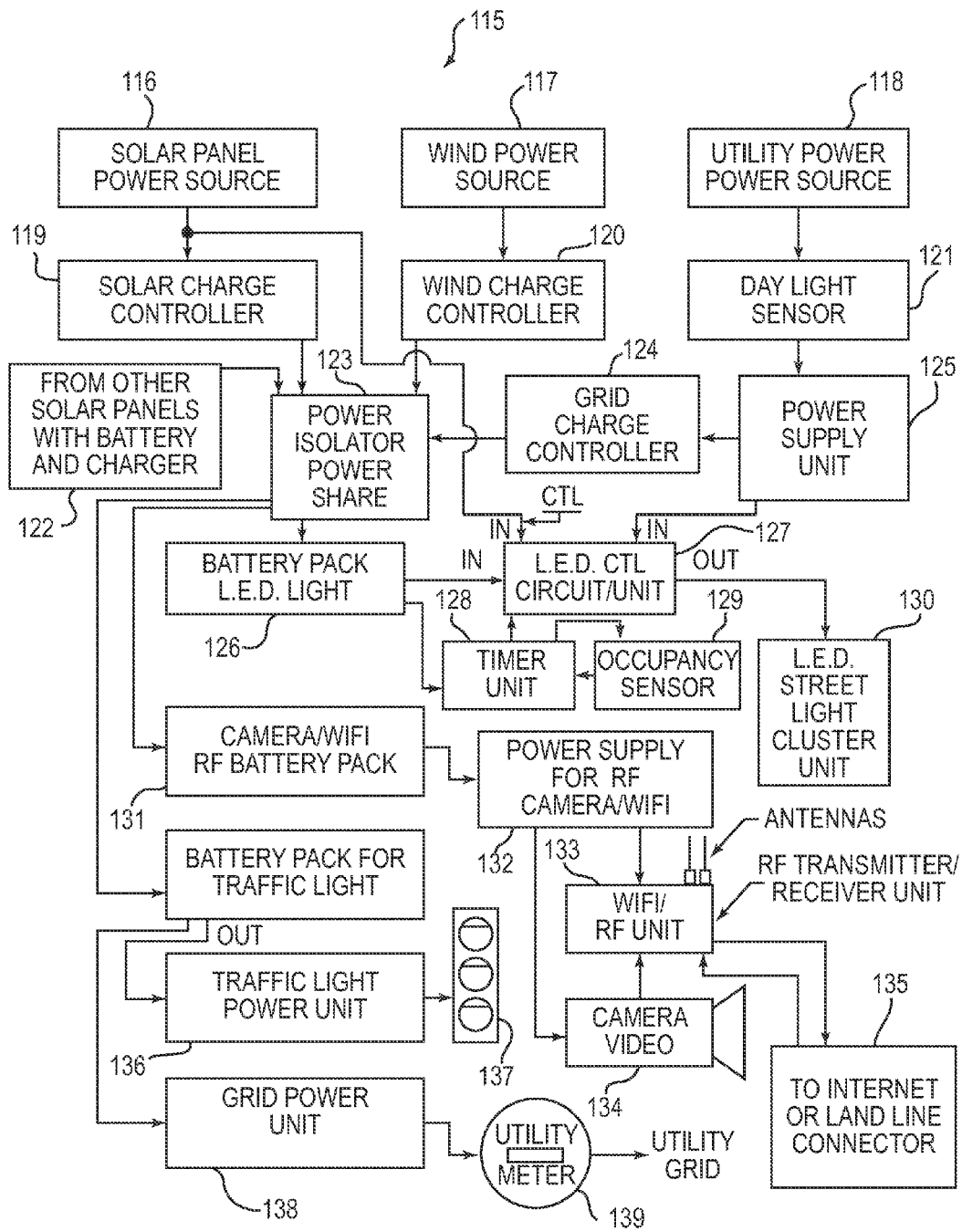
FIG. 9 illustrates a component flow diagram of the solar and wind powered street/roadway lighting apparatus according to the present invention.

Referring now to the block diagram of FIG. 9, the solar cells 13 are configured by the Solar panel Power Source 116 to provide DC Voltage to the Solar Charge Controller 119 that regulates the charge cycle and connected to the LED Control (CTL) Circuit Unit 127, this scene occurs when it is (dusk) and turn power to the LED Street Light Cluster Unit 130 with the arrival of (dawn) Day Light, the control unit will turn off power to the LED Street Light Cluster Unit 130 in the Cobra Head Light Unit.

The LED Control (CTL) Circuit Unit 127 receives Power from the Battery Pack LED Light Unit 126, which also send Power to the Timer Unit 128. Power goes from the Timer Unit 128 to the Occupancy Sensor 129, when activated the Occupancy Sensor 129 will send a trigger pulse high or low to activate the Timer Unit 128. The Timer Unit 128 will then send a high or low voltage control signal to activate the Power Management Circuit to lower the current draw from the LED Street Light Cluster Unit 130. Also the Grid Power Supply Unit 125 will also supply power to the LED Street Light Cluster Unit 130, which will enable the LED Street Light Cluster Unit to operate with or without grid power.

The Triangle Mount Solar Panels all have Charge Controller 119. Two Panels have individual charge controller with battery 122 and one have only charge controller connected to the Power Isolator and Power Share Unit 123.

The Wind Turbine Power Source 117 connected to the charge controller 120 then to the Power Isolator and Power Share Unit 123.

The Utility Power Source 118 is connected to the Day Light Sensor 121 from Day Light Sensor 121 to the Power Supply Unit 125 to the Grid Charge Controller 124.

Then the Utility Power Source 118 is connected to the Day Light Sensor 121 from the Day Light Sensor 121 to the Power Supply Unit 125 to Grid Charge Controller 124 and to the Power Isolator and Power Share Unit 123. This unit uses high speed Blocking Diodes to prevent the reversal of DC Voltage to other in coming DC Voltage from other power sources. The Power Sharing Circuit 123 directs the DC Voltage to charge individual Battery Packs.

The unit has three (3) Battery Packs. Of these three Battery Packs, Battery Pack 126 is used to power the LED Circuit Unit 127, Timer Unit 128, Occupancy Sensor 129 and the LED Street Light Cluster Unit 130 for the Cobra Head Light Unit.

The second Battery Pack 131 is used to supply power to the Power Supply Unit 132, which regulate and send power to the WIFI, RF Transmitter/Receiver 133, Video Camera 134 and USB Ports 135.

The Third Battery Pack is used to send power to the Inverter 136 to power the traffic and control system. The Grid Tie Inverter 138 shares power from the same battery pack to send power back to the Utility GRID. This unit is scalable with the solar panel, battery and LED Light Cluster 130 for the Cobra Head and Shoe Box Lighting.

Note that that all in/out connections including antennas are made at the Connection Panel 135

Figure 10:
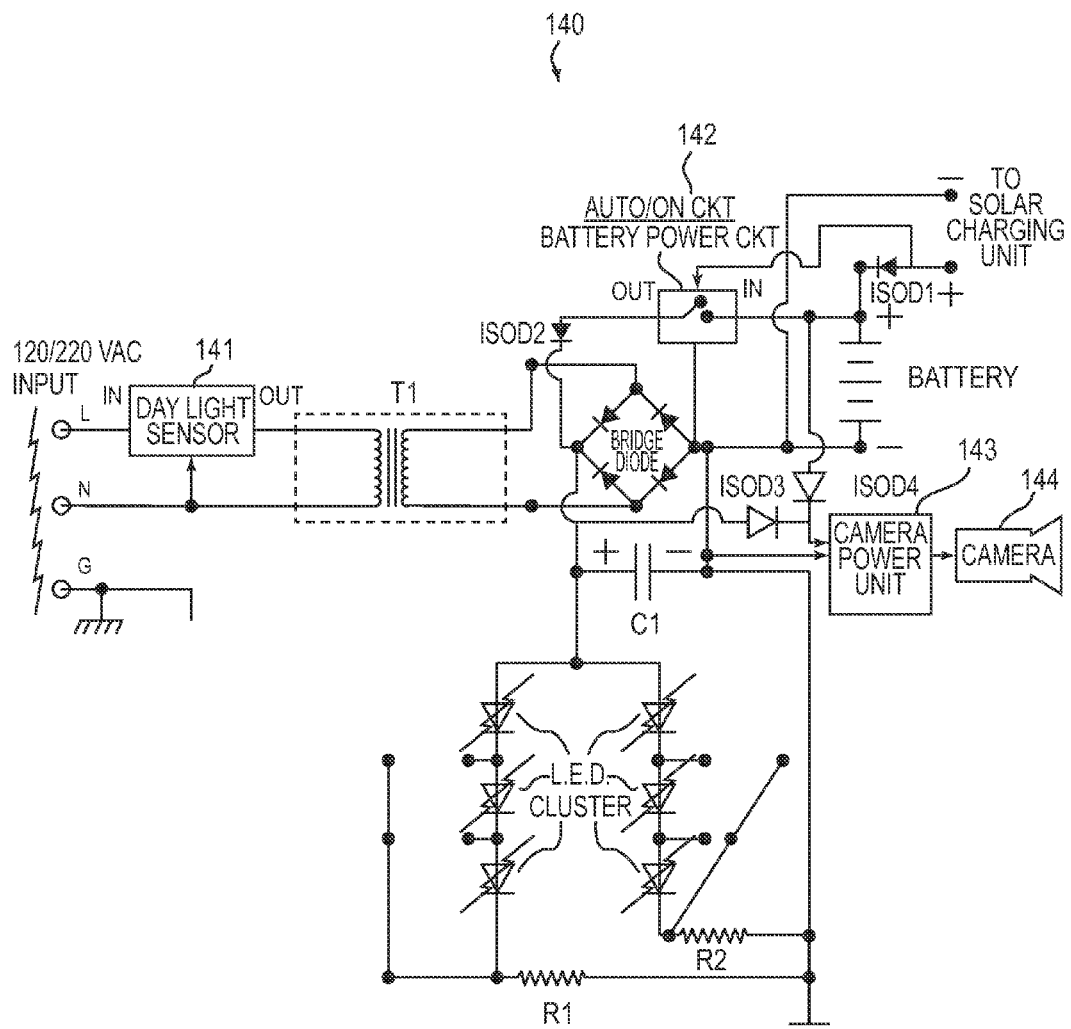
FIG. 10 illustrates a driving circuit for the solar and wind powered street/roadway lighting apparatus according to the present invention.

With reference to FIG. 10, the Day Light Sensor Circuit 141 is connected between the utility grid (120/200 VAC) and the primary winding of (T1), that is transformer 1 is designed with an auto current and voltage protection that will disconnect the primary winding of (T1) transformer 1 due to higher voltage, such that the primary winding is designed to operate at the MOV. This can also protect against high transient voltage or lightening, which will trigger the resettable fuse to open and reset with normal voltage operation.

The second feature is the current sensor that is designed trigger the resettable fuse due to short or high current draw on the secondary winding of (T1).

The LED CTL AUTO SW CIRCUIT 142, also have high voltage and high current sensing circuit protection with the DC Voltage and current, the auto resettable fuse will disconnect, if there is a short in the secondary. The Camera Power Unit also has the same protection.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. An improved solar and wind powered LED lighting unit comprising:
    a roadway/street light pole;
    a polygonal frame member configuration disposed about the roadway/street light pole;
    a plurality of solar panels with a plurality of sealing gaskets attached directly to the polygonal frame;
    a first plurality of different types of electrical modules that are affixed directly to at least one of an interior back wall of at least one of the solar panels and a second plurality of different types of electrical modules that are affixed directly to at least another one of an interior back wall of at least another one of the solar panels defining a isolating, sharing, controlling, monitoring and managing power system for delivering the required amount of power to operate the LED lighting unit efficiently, wherein the plurality of first and second electrical modules are closely arranged and spaced from each other without interfering with the polygonal frame member and the roadway/street light pole when attached together as a single unit;
    a wind turbine being secured to the roadway/street light pole for generating power to the first and second plurality of different types of electrical modules; and
    a top and bottom two-part closure plate having semi-circular grooves to completely seal and surround the roadway/street light pole; and
    the two-part closure plates are attached directly to the polygonal frame member and completely enclose and seal the plurality of electrical modules between the frame member and at least one of the solar panels.

2. The improved solar and wind powered LED lighting unit according to claim 1, wherein the polygonal frame may be selected from the group of polygons consisting of a triangle, quadrilateral, pentagon, hexagon, heptagon, octagon, enneagon, decagon, squares, rectangles, parallelograms and rhombuses.

3. The improved solar and wind powered LED lighting unit according to claim 1, wherein the two-part plates includes a pair of C-shaped clamps with outward extending flanges with a securing hole therein, a semi-circular groove in the middle of the C-shaped clamps, the C-shaped clamps are secured directly to the top of the two-part plates so that the semi-circular grooves of the two-part plates and the semi-circular grooves of the C-shaped clamps are contiguous and above one another and about the roadway/street light pole.

4. The improved solar and wind powered LED lighting unit according to claim 3, wherein a sealing gasket is disposed in each of the semicircular grooves of the C-shaped clamps and is sealed around the roadway/street light pole when screw means are threaded through the securing holes of the C-shaped flanges to compress the sealing gasket in tight sealing engagement about the roadway/street light pole to prevent water and moisture from getting to the electrical modules.

5. The improved solar and wind powered LED lighting unit according to claim 1, wherein the polygonal frame member has a top and bottom mounting plate disposed between plural wall surfaces with semi-circular grooves therein for receiving first C-shaped clamps with outward extending securing flanges therein, the mounting plates are positioned just below the two-part top plate and just above the bottom plate, and at least the first C-shaped clamp below the top two-part plate includes a sealing gasket therein to engage with the roadway/street light pole.

6. The improved solar and wind powered LED lighting unit according to claim 5, wherein a second pair of C-shaped clamps with outward extending flanges having a screw hole therein and that are aligned with the top and bottom first C-shaped clamps of the mounting plates, a second gasket is disposed within the top second C-shaped clamp so that when a screw member is threaded through the flange screw openings of the first and second flanges of the first and second C-shaped clamps to compress the sealing gaskets about the roadway/street light pole to eliminate any water and moisture from getting to the electrical modules.

7. The improved solar and wind powered LED lighting unit according to claim 1, wherein the LED lighting unit include an outer die cast shell, a polished aluminum basin disposed within the outer die cast shell with a continuous flow passage formed there between to constantly circulate ambient air about the aluminum polished basin to preserve the life cycle of LED chips, and four corner right angle brackets forming an L-shape configuration disposed and secured at and above a lower rim portion of the polished aluminum basin for supporting and raising a heat sink plate with LED chips disposed thereon to a height to form an interior enlarged space above the heat sink plate that defines primarily the entire interior volume of the polished aluminum basin to increase rapid transfer of heat from the heat sink plate to further preserve the life cycle of the LED chips.

8. The improved solar and wind powered LED lighting unit according to claim 7, wherein the heat sink plate having a circuit board for holding the LED chips with a plurality of wide fins on a bottom surface thereof that projects into the enlarged volume space and secured by screws from the circuit board, and a heat compound applied to a bottom surface of the LED chips and a top surface of the heat sink plate to increase heat transfer.

9. The improved solar and wind powered LED lighting unit according to claim 8, wherein the circuit board includes a copper track covered with high temperature paint for insulation and use as a reflector.

10. The improved solar and wind powered LED lighting unit according to claim 7, the polished aluminum basin further includes an elongated aluminum plate secured and sandwiched and in an engaging relationship between a top inner side wall surface of the outer die cast shell of the lighting unit and along a top outer surface of the polished basin for additional heat dissipation to further preserve the life cycle of the LED chips, wherein the aluminum plate has a larger intermediate section with two smaller outward extending ends connected by a pair of incline portions there between and is secured from the inside of the polished aluminum basin to the outer die cast shell through a screw opening disposed in the intermediate section of the elongated aluminum plate and into engagement with the outer die cast shell by a screw member that is first inserted through a screw opening of the polished aluminum basin.

11. The improved solar and wind powered LED lighting unit according to claim 7, wherein an entire surface of the heat sink plate is covered with high temperature white paint so that exposure to water and moisture will prevent short circuiting.

12. The improved solar and wind powered LED lighting unit according to claim 7, wherein the outer die cast shell includes a circular open ambient air space at a bottom surface of the middle section of the outer die cast shell at a rear end thereof, a plurality of vent holes being disposed on a bottom surface of the middle section for ambient air flow communication with the circular open ambient air space and into an air opening in a rear portion of the polished aluminum basin to allow ambient air flow into the enlarged volume space, and a plurality of vent holes in a front face and in at least one side of the aluminum basin and in a rear to enable a continuous ambient air circulation to flow from the enlarged volume space to the outside of the polished aluminum basin into an annular continuous space between the polished aluminum basin and the die cast outer shell to effectively remove the heat from the plurality of wide fins, the heat sink plate and from the enlarged volume space to protect the LED chips by exiting heated ambient air via at least through the plurality of vent holes in the bottom surface of the middle section.

13. The improved solar and wind power LED lighting unit according to claim 1, wherein lighting unit includes a pivotal hinged rear cover that includes a plurality of vent holes for admitting ambient air to the polished aluminum basin and for exiting heated ambient air from the polished aluminum basin, a power supply module, a barrier strip, a power transformer, a locking screw opening, and a locking screw member for closing the cover relative to the lighting unit.

14. The improved solar and wind powered LED lighting unit according to claim 13, improved solar and wind power LED lighting unit has a rear portion that is closed by the rear cover and includes a rear opening for receiving a utility pole mounting pipe and is secured therein by a pair of C-shaped clamps with securing flanges, a barrier strip, a day light sensor socket, a camera power supply, a WIFI transmitter, a locking flange with a locking screw hole for the locking screw of the cover to lock them together, and an open ambient air space area under the locking flange that allows ambient air to flow into the annular continuous space between the polished aluminum basin and the aluminum die cast outer shell housing through a circular open ambient air space into and out of the polished aluminum basin through a plurality of vent holes in the polished aluminum basin and the outer cast shell.

15. The improved solar and wind powered LED lighting unit according to claim 14, includes a front section that includes a plurality of air vent holes behind a front lens cover when it is closed on a bottom surface of a middle portion of the outer die cast shell adjacent the open ambient air space area under the locking flange, a camera is disposed on the bottom surface between the plurality of vent holes on the bottom surface in the middle portion of the outer die cast shell, a polished aluminum basin disposed within an outer die cast shell, a heat transfer plate secured between the polished aluminum basin and the outer die cast shell for additional heat dissipation, a plurality of vent holes in the side walls and the front wall of the polished aluminum basin, a circular opening in the rear of the polished aluminum basin for constant ambient air flow circulation, a heat sink plate with LED chips disposed thereon with a plurality of heat fins extending from a bottom surface thereof and a lens latch for closing the front lens cover.

16. The improved solar and wind powered LED lighting unit according to claim 1, wherein the first plurality of different types of electrical modules include at least a solar panel power source, wind power source, utility power source, power isolator and sharing device, grid charge controller, power supply unit, battery pack LED light, LED control circuit unit, LED street light cluster unit, timer unit, occupancy sensor, LED street light cluster unit, camera/WIFI/RF battery pack, camera/WIFI/RF power supply, camera video, RF transmitter/receiver unit, internet/land line connector control panel, traffic light power unit, traffic light device, grid power unit, utility meter and utility grid.

17. The improved solar and wind powered LED lighting unit according to claim 1, wherein the second plurality of various and different types of electrical modules include at least a solar charge controller, a wind charge controller, and solar panel batteries and chargers.

18. An improved renewable energy and rechargeable LED lighting unit comprising:
 a roadway/street light pole;
 a polygonal frame member having a triangular configuration disposed about the roadway/street light pole;
 a plurality of solar panels with a plurality of sealing gaskets attached directly to the triangular polygonal frame;
 a first plurality of different types of electrical modules that are affixed directly to at least one of an interior back wall of at least one of the solar panels and a second plurality of different types of electrical modules that are affixed directly to at least another one of an interior back wall of at least another one of the solar panels defining a compact isolating, sharing, controlling, monitoring and managing power system for delivering the required amount of power to operate the LED lighting unit, a traffic/streetlight system, surveillance and camera system, land line connector equipment and for grid-tie purpose, wherein the plurality of first and second electrical modules are arranged and spaced from each other without interfering with the polygonal frame member and the roadway/street light pole when attached together;

a wind turbine attached to the roadway/street light pole for generating power to the compact isolating, sharing, controlling, monitoring and managing power system;

a top and bottom two-part closure plate having semi-circular grooves to completely seal and surround the roadway/street light pole; and the two-part closure plates are attached directly to the triangular polygonal frame member and completely enclose and seal the plurality of electrical modules between the triangular frame member and at least two of the solar panels without any interference there between.

19. The improved renewable energy and rechargeable LED lighting unit according to claim 18, wherein the compact isolating, sharing, controlling, monitoring and managing power system includes at least a solar panel power source, wind power source, utility power source, solar charge controller, wind charge controller, solar panel batteries and chargers, power isolator and sharing device, grid charge controller, power supply unit, battery pack LED light, LED control circuit unit, LED street light cluster unit, timer unit, occupancy sensor, LED street light cluster unit, camera/WIFI/RF battery pack, camera/WIFI/RF power supply, camera video, RF transmitter/receiver unit, internet/land line connector control panel, traffic light power unit, traffic light device, grid power unit, utility meter and utility grid.

20. The improved solar and wind power generator comprising:

a solar source;
a wind power source;
a LED lighting device;
a roadway/street light pole;
a polygonal frame member having a selective polygonal configuration disposed about the roadway/street light pole;
a plurality of selective polygonal shaped solar panels having a plurality of sealing gaskets and being attached directly to the polygonal frame;
first plurality of different types of electrical modules that are affixed directly to at least one of an interior back wall of at least one of the solar panels and a second plurality of different types of electrical modules that are affixed directly to at least another one of an interior back wall of at least another one of the solar panels for sharing, isolating, monitoring, managing and delivering the required amount of power for operation of the LED lighting device as a function of the solar and wind power sources;
a top and bottom two-part closure plate having semi-circular grooves to completely seal and surround the roadway/street light pole; and
the two-part closure plates are attached directly to the selective polygonal frame member and completely enclose and seal the plurality of electrical modules between the selective polygonal frame member and at least two of the solar panels without any interference there between.

* * * * *